United States Patent [19]

Mason

[11] 4,215,301
[45] Jul. 29, 1980

[54] DIGITAL SERVO POSITIONING CIRCUIT

[75] Inventor: Martin K. Mason, West Newbury, Mass.

[73] Assignee: Hewlett-Packard Company, Palo Alto, Calif.

[21] Appl. No.: 949,481

[22] Filed: Oct. 10, 1978

[51] Int. Cl.² ............................................. G05B 19/28
[52] U.S. Cl. ................................... 318/603; 318/601; 318/690
[58] Field of Search ............... 318/603, 602, 601, 561, 318/640, 571, 600

[56] References Cited

U.S. PATENT DOCUMENTS

| | | | |
|---|---|---|---|
| 3,400,314 | 9/1968 | Wilson | 318/603 |
| 3,731,177 | 5/1973 | Commander et al. | 318/603 |
| 3,752,969 | 8/1973 | Kiffmeyer et al. | 318/601 |
| 4,146,922 | 3/1979 | Brown et al. | 318/603 X |

Primary Examiner—B. Dobeck
Attorney, Agent, or Firm—Donald N. Timbie

[57] ABSTRACT

A digital servo system is described in which the error signal is multiplied up to a given maximum before its application to a D/A converter that provides control voltage for the motor, as long as the motor has not reached its final position and its velocity is greater than a predetermined amount.

5 Claims, 1 Drawing Figure

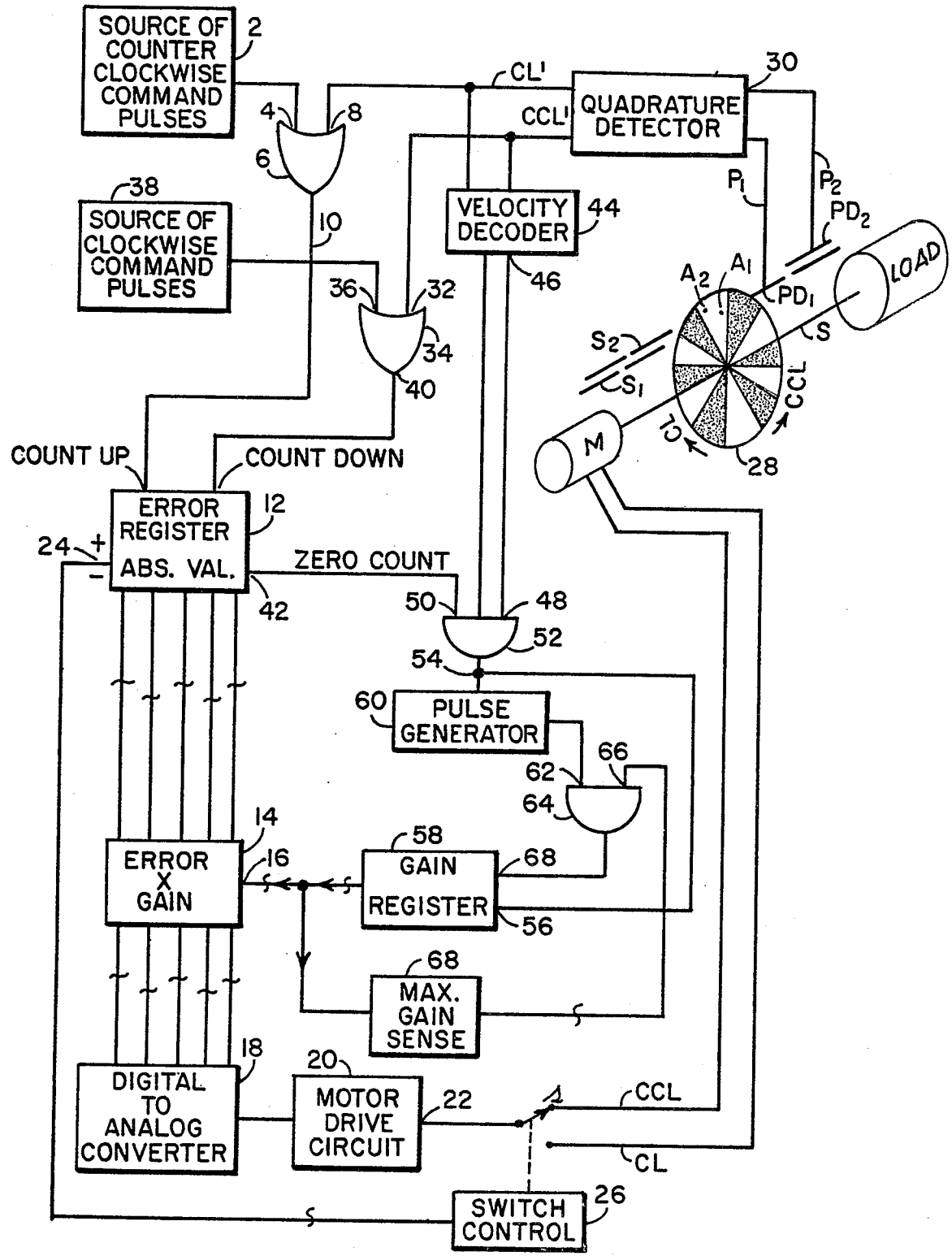

DIGITAL SERVO POSITIONING CIRCUIT

BACKGROUND OF THE INVENTION

In basic servo systems, the force applied by a motor or its equivalent to the controlled member to move it to a desired position is generally proportional to an error signal representing the difference between the desired position of the member and its actual position at any time. When the force applied by the motor to the member decreases below the ever-present force of friction, the member stops at a position that may be far from that desired. One way of overcoming this difficulty is to increase the gain of the servo loop so that the force applied to the member does not drop below that required to overcome the friction until the member is nearer to the desired position. The disadvantages of the extra power and expense required to solve the problem in this manner can be reduced by inserting integral feedback into the feedback loop, i.e., integrating the error signal. This ultimately causes a force to be applied to the member that is sufficient to overcome the friction after a time even though a previous error signal would not of itself produce sufficient force to do so. This approach adds significant complexity and makes the attainment of good dynamic control more difficult.

BRIEF DISCUSSION OF THE INVENTION

In accordance with this invention, the force exerted on the controlled member is set at a minimum value by multiplying the error signal by a predetermined minimum factor. Under this condition, the controlled member comes to rest when the corresponding minimum force just equals the force of friction. The factor by which the error signal is then multiplied so as to increase to force exerted on the controlled member until it is moved to the desired position. When this occurs, the factor by which the error signal is multiplied is reduced usually to the predetermined minimum referred to. Inasmuch as the increase in the value of the factor by which the error signal is multiplied does not take place until the controlled member initially comes to rest, the dynamic performance is unimpaired.

BASIC SERVO SYSTEM

Counterclockwise Rotation

Assume that the motor M is to be rotated in a counterclockwise direction. In the digital servo system illustrated in the drawing, a source 2 provides a number of sequential command pulses to an input 4 of an OR gate 6 equal to the number of angular increments through which a motor M is to be rotated in the counterclockwise direction indicated by an arrow CCL. For reasons to be explained, the input 8 of the gate 6 will be in a low state so that the pulses appear at the output 10 of the OR gate 6. This output is connected to a "count up" input of an error register 12. The digital output of the error register 12 represents the absolute value of the error signal and is applied to a multiplier 14 that multiplies the absolute value of the error signal by a factor determined by a digital word applied to a control input 16. After multiplication, the resulting digital word is transferred to a D/A converter 18 that applies a control voltage proportional to the value of the error signal represented by the digitized word at the output of the multiplier 14 to a motor drive circuit 20. In response, the motor drive circuit 20 supplies a proportional voltage suitable for driving the motor M at its output 22. If, as has been assumed, the motor M is to be rotated in the counterclockwise direction, the output 22 is connected by a switch s to a lead CCL that connects it to windings, not shown, in the motor M for rotating it in the counterclockwise direction. The position of the switch s is determined by connecting a terminal 24 on the error register 12 to a switch control circuit 26. The terminal 24 has one polarity when the error count is positive and the opposite polarity when the error count is negative. With the particular configuration shown, the error signal is positive when the command signal calls for a counterclockwise rotation of the motor M.

Various types of encoders may be used as means for indicating the number of angular increments through which the motor M rotates in response to a command signal, but the one illustrated includes a disc 28 having alternate transparent and opqaue sectors mounted for rotation with the shaft S. A source $S_1$ of a beam of light and a photodetector $PD_1$ are mounted on opposite sides of the disc 28 and aligned with a point $A_1$. A source $S_2$ of a beam of light and a photodetector $PD_2$ are mounted on opposite sides of the disc 28 and aligned with a point $A_2$. The points $A_1$ and $A_2$ are angularly displaced with respect to the center of the disc 28 by one-half of the angle of a single sector. As the disc 28 rotates, the alternate transparent and opqaue sectors pass through the point $A_1$ and cause the photodetector $PD_1$ to produce pulses $P_1$ that are applied to one input of a quadrature decoder 30. The sectors also pass through the point $A_2$ and cause the photodetector $PD_2$ to produce pulses $P_2$ that are applied to another input of the quadrature decoder 30. The pulses $P_1$ and $P_2$ are 90° out of phase and, in response, the quadrature detector 30 produces pulses on a lead CCL' only when the disc 28 is rotating in a counterclockwise direction.

The pulses on the lead CCL', which may be called a position signal, are applied to an input 32 of an OR gate 34, and inasmuch as no pulses are supplied to the other input 36 from a source 38 of clockwise command pulses, the pulses on the lead CCL' appear at the output 40 of the OR gate 34 and are applied to the "count down" input of the error register 12. When the number of these pulses equals the number of command pulses applied to the "count up" input of the error register 12, the motor M has rotated through the number of angular increments determined by the number of command pulses from the source 2. The count at the output thereof will then be zero, a fact that is indicated by a low voltage state at an output 42 of the error register 12. Under this condition, it makes no difference what is applied to the input 16 of the multiplier 14 as the input to the multiplier 14 is zero. This causes the voltage supplied by the D/A converter 18 to be zero so that the motor drive voltage at 22 is zero. During the count up and count down, the sign of the count is positive and is indicated by the positive voltage at the output 24. As previously stated, application of this voltage to the switch control 26 causes it to move the switch s into contact with the lead CCL.

Clockwise Rotation

Now assume that the motor M is to be rotated in a clockwise direction as indicated by the arrow CL. A source 38 supplies clockwise command pulses to the input 36 of the OR gate 34, causing it to output pulses to the "count down" input of the error register 12. The absolute value represented by the output of the error register 12 increases and is multiplied in the multiplier 14 before being applied to the D/A converter 18. The motor drive circuit 20 produces a voltage at its output 22 as before, but because the count is down, the output 24 of the error register 12 is now negative. This causes the switch control 26 to move the switch s into contact with the lead CL which is connected to windings, not shown, in the motor M that rotate it in a clockwise direction as indicated by the arrow CL. Pulses $P_1$ and $P_2$ are produced as the sectors of the disc 28 pass through the points $A_1$ and $A_2$, but their phase relationship is different. This causes the quadrature detector 30 to output pulses only on the lead CL' that is connected to the input 8 of the OR gate 6. It then outputs pulses corresponding to the pulses in the lead CL' to the "count up" input of the error register 12. When the number of these pulses equals the number of pulses supplied by the source 38, the error count becomes zero and the motor M comes to rest.

The Invention

Were it not for friction, the motor M would be rotated through the desired number of angular increments in the manner just described, but because friction is always present, the motor M may stop before it has rotated to the desired point. Under this condition, the absolute value of the count in the error register 12 will have some finite value and cause an output at 42 to be in a high state. Even though the motor M has not reached the desired position, it is stopped so that no pulses are produced on either lead CCL' or CL' by the quadrature decoder 30. The leads CCL' and CL' are connected to the inputs of a velocity decoder 44. Its output 46 goes high when the velocity falls below a low preset value, indicating that the motor has essentially stopped. Application of this high state voltage to inputs 48 and 50 of an AND gate 52 causes its output to be high. The output 54 of the AND gate 52 is applied to an input 56 of a pulse generator 60. When the output 54 is in a high state, it causes the pulse generator 60 to start outputting pulses to an input 62 of an AND gate 64. If its other input 66 is in a high state, the AND gate 64 will output pulses corresponding to the pulses supplied by the pulse generator 60 to a "count up" input 68 of the gain register 58. The output of the gain register 58 is applied to the input 16 of the multiplier 14 so as to increase the factor by which it multiplies from its operational or normal value. This increases the voltage produced by the D/A converter 18 to a point where the motor M exerts enough torque to overcome friction and start turning once again toward the desired position determined by the number of command pulses from either source 2 or source 38. As a result of the rotation, pulses $P_1$ and $P_2$ are applied to the inputs of the quadrature encoder 30 causing it to output pulses on lead CCL' or CL' depending on the direction of rotation.

As long as the motor M rotates very slowly, the output of the velocity decoder 46 remains high, but when the rotation of the motor M increases beyond a given point, its output drops to a low state. Then, regardless of the voltage state at the output 42 of the error register 12, the output 54 of the AND gate 52 falls to a low state and turns off the pulse generator 60. Because the output 54 is connected to the reset input 56 of the gain register 58, its output is set back to a normal value. The motor M will probably stop, but it will be closer to the desired position. The process will then be repeated until the desired position is reached. At this point, the count in the error register 12 is zero and its output 42 falls to a low state. Therefore, regardless of the state of the output of the velocity decoder 46, the output 54 of the AND gate 52 will be low so as to turn off the pulse generator 60 and keep the gain at its normal value via the input 56.

A maximum gain sensing means 68 is connected to receive the digital output of the gain register 58. When the output reaches the maximum value of gain, such that one error count causes full drive voltage, the output of the gain sensing means 68 will fall to a low state. Because this output is applied to the input 66 of the AND gate 64, its output will remain low even when pulses are applied to its input 62 from the pulse generator 60. As a result, the count in the gain register 58 remains at the maximum allowed value until, as previously explained, the error register 12 attains a zero count or a non-zero velocity is sensed.

Summary

From the foregoing discussion, it is seen that either of the sources 2 or 38 are means for providing command signals indicative of the amount by which the load is to be moved. In this case, the load L is to be rotated but the motion could follow a straight line or other path by use of a linear motor or by suitable mechanical coupling to the motor M. The sector wheel 28 and the quadrature decoder 30 are one means for providing a position signal that is indicative of the amount by which the load L is rotated, but other means could be provided if a linear motor is used. An error signal indicative of the difference between the amount by which the members of a load L is to be moved in accordance with the command signals and the amount by which it has been moved is provided by means such as the error signal register 12.

A multiplying means 14 effectively multiplies the error signal provided by the error register 12 by a given factor and the velocity decoder 44 is a means for providing a velocity signal indicative of the velocity at which the load L is moving. The AND gate 52, the pulse generator 60, and the gain register 58 are means for increasing the factor by which the multiplying means 14 multiplies the error signal when the error signal is other than zero and the velocity of the member or load L is less than a predetermined amount.

The AND gate 52 and the connection between the output 54 and the reset terminal 56 of the gain register 58 is a means for reducing the factor by which the multiplying means 14 multiplies the error signal to a predetermined operating value in response to the error signal reaching a value representing zero error or the velocity signal provided by the velocity decoder being indicative of the fact that the velocity is greater than a predetermined amount.

The maximum gain sensor 68 and the AND gate 64 are means for preventing an increase in the factor by which the multiplying means 14 multiplies the error signal to a given maximum amount.

What is claimed is:

1. A servo system for moving a member at a given position,
    a source of command signals indicative of the amount by which said member is to be moved,
    means for providing a position signal indicating the amount by which said member is moved,
    means for deriving an error signal indicative of the difference between the amount by which the member is to be moved in accordance with the command signals and the amount by which is has moved as indicated by the position signal, multiplying means for multiplying the value of the error signal by a given factor, means responsive to the multiplied error signal for applying a force to said member that is proportional to the value of the multiplied error signal, means for producing a velocity signal indicative of the velocity of said member, means for increasing the factor by which the said multiplying means multiplies said error signal when said error signal is other than zero and said velocity signal indicates that the velocity of the member is less than a predetermined amount, and means for reducing the factor by which the said multiplying means multiplies said error signal to a predetermined operating value in response to the error signal reaching a value representing zero error or the velocity signal having a value indicating that the velocity of said member is greater than a predetermined amount.

2. Apparatus as set forth in claim 1 wherein means are provided for preventing the said means for increasing the factor by which the said multiplying means multiplies the error signal from increasing the factor to above a given maximum amount.

3. A digital servo system comprising, a digital error register having a count-up input, a count-down input, a digital bit output representing the absolute value of the difference between the number of pulses applied to the count-up input and the number of pulses applied to the count-down input, said digital error register having another count, and a signal output having one state when the absolute value is zero and another state when the absolute value is other than zero, a digital multiplier having bit inputs coupled to the bit outputs of said error register, an output, and a digital input controlling the factor of multiplication, a motor, means responsive to the digital output of said multiplier for developing a control voltage for said motor that is proportional to the count thereat, means controlling the rotation of said motor with said control voltage, means sensing the angular increments through which said motor turns and producing a pulse for each angular increment through which it turns, means for reducing the absolute value of the count in said error register with each of said pulses, means for producing a velocity signal having a first value when the rate at which said motor rotates is less than a predetermined amount and a second value when the rate is greater than the predetermined amount, a variable gain register having a digital output coupled to the digital input of said multiplier and a reset input for resetting said digital output to an operating count, means for increasing the count in said gain register when the count in said error register is other than zero and said velocity signal has said first value, and means coupled to said reset input of said variable gain register for resetting it to said operating count when said error signal count is zero and said velocity signal has the second value.

4. A servo system as set forth in claim 3 wherein means are provided for disabling said means for increasing the count in said gain register when the count reaches a given value.

5. A servo system comprising means for producing at its output an error signal representing the difference between a desired position of a member to be controlled by the servo system and its actual position and a signal having first value when the error signal is zero and a second value when the error signal is other than zero, multiplying means having an input coupled to the output of said means for producing an error signal, the multiplying means having an output at which the multiplied error signal appears, multiplication control means coupled to said multiplying means for controlling the factor of multiplication it provides, velocity detecting means for producing at its output a velocity signal representing the velocity of said member, gain control means having inputs coupled to the output of said velocity detecting means and responsive to a signal thereat representing zero velocity and to an error signal other than zero at the output of said means for producing an error signal for increasing the factor of multiplication, means coupled to the output of said means for producing an error signal for preventing said gain control means from further increasing the factor of multiplication when said error signal is zero, and means for causing said gain control means to set the factor of multiplication at a predetermined value when said velocity signal is zero and said error signal is zero.

* * * * *